UNITED STATES PATENT OFFICE.

CARL ROTH, OF FRANKFORT-ON-THE-MAIN, GERMANY.

MANUFACTURE OF COATING AND IMPREGNATING MATERIALS.

1,095,988.      Specification of Letters Patent.      Patented May 5, 1914.

No Drawing.      Application filed January 29, 1913. Serial No. 745,018.

*To all whom it may concern:*

Be it known that I, CARL ROTH, chemist and doctor of philosophy, a citizen of the German Empire, and resident of Frankfort-on-the-Main, Germany, (with the post-office address Sömmeringstrasse 30,) have invented new and useful Improvements in the Manufacture of Coating and Impregnating Materials, of which the following is a specification.

Materials which are to be used as varnishes, coatings or insulations and are liable to contact with industrial effluents, such for example, as waste gases, chemically impregnated water and the like and active constituents of the soil, fulfil their protective function more completely and longer the more chemically stable they are originally to the attack of dilute acids and alkalis as well as gaseous substances dissolved in water. Natural asphalt and solid constituents of tar are suitable for the aforesaid purposes only in so far as their general chemical character meets the requirements. For the origin and descent of these substances determine that more or less of their constituents are liable to the solvent or destructive effect of the agents in question, whereby such constituents are removed by the water. When, therefore, such chemically destructible constituents are present in varnishes made from asphalt or tar, they are washed away by the water from the covered surfaces leaving an imperfect protective layer.

The following observation has been made: When a varnish made from tar or asphalt is subjected to a water of the kind in question containing active substances to an extent short of that which would destroy the whole mass, but only injure it by removing certain parts, there remain residual substances which when again made up into a varnish by means of a suitable solvent are able to resist further attack of the same water. In this manner behave the residues of coatings which have been subjected on pipes and surfaces of tanks to gradual destruction, sometimes by acid marshy ground, sometimes by strong alkaline conditions, and even by water rich in carbon dioxid and oxygen.

The present invention is based on the investigation of the aforesaid observation.

According to the invention natural asphalt, asphalt purified by known special processes, solid residues from the distillation of bituminous and fossilized materials, or tar pitch of any kind, is first powdered as finely as possible. This pulverizing operation must, if necessary, be carried out in a cooled chamber, if materials of such low melting point are under treatment that they would soften and agglomerate under the influence of a raised temperature so that they could not be ground. The finely ground dusty bituminous substance is left in contact with an acid or an alkaline liquid, or with each in succession, while constantly stirred, or while air is blown through, the treatment lasting for days, weeks or months.

The action of the acid or alkaline substance on the powdered material must occur at temperatures below the melting point of the material, otherwise the finest particles would become mechanically united in a mass impenetrable by the active liquid and would remain for the most part unchanged by the chemical action which is the object of the operation. Generally speaking temperatures between 25 and 60° C. are best for the purpose in question accordingly as the separate constituents of the material show no tendency to agglomerate or fuse together within these limits.

Correspondingly with the degree of resistance which the coating or impregnating material is to have in its subsequent practical application, the degree of concentration of the acid or alkali which is used in the preliminary process for providing permanence may be varied, thus more or less dilute hydrochloric acid, nitric acid and sulfuric acid may serve the purpose indicated. The concentration of the acid is diminished at first by decompositions which, according to the acid selected, are accompanied by considerable evolution of gas or by the formation of nitro-substances.

In general the subsequent protection of the varnish against the action of dilute acids is achieved if the finely powdered bituminous substance is left in contact for two months at about 25° C. with hydrochloric acid of specific gravity 1.125, or with sulfuric acid of specific gravity 1.116, or with nitric acid of specific gravity 1.054. The resistance of the organic basis is only increased when the treatment during the said period or a longer period is not with a single acid but with all three in succession. The use of quite dilute nitric acid has the particular advantage that the bituminous constituents of the coating, which latter would be decomposed by oxygen absorbed in water, are already removed during the artificial process of preparing the coating material.

According to the specific nature of the materials which are to constitute the coating or impregnating substance, the finely powdered basis can be subjected for a sufficiently long time to the exact action of exactly the same substances which it is subsequently to resist, for the purpose of improving its chemical stability; for example, in the case of a coating material which is subsequently to be used for protecting iron pipes laid in peat soil, ferrous sulfate solution and acid marshy soil suspended in water may be used as the materials for the preliminary treatment. When such a use of the coating material is in view this variety of the process affords at least as much protection as the use of dilute sulfuric acid as an agent for lending stability. Instead of dilute mineral acids there may be used for example solutions of acid sulfates, acetic acid, oxalic acid, lactic acid or other substances of acid character, particularly in cases in which the coating or impregnating material is later to have a protective action against the same agents. The like may be said with reference to lending permanence to coating materials against the action of water rich in carbon dioxid; in this case the object may be achieved by retaining the ground powder suspended in water in a closed iron vessel, the water being impregnated with carbon dioxid under more or less pressure.

When the bituminous basis for the varnish or coating is to be made permanent with respect to dilute alkalis, the object may be achieved by use of good caustic soda lye of about 1.1 specific gravity, or an aqueous solution of ammonia of 25 per cent. strength, or milk of lime made by slaking 1 part of quicklime and distributing it in 50 to 100 parts of water. In this case also the essence of the method consists in allowing the powdered substance to remain in contact with the agent for days, weeks or months, according to the temperature to which one can subject the substance, the mixture being stirred the while either mechanically or by blowing air through it; in this manner the destructible constituents are removed from the coating material.

If ammonia solution is used for the purpose it is necessary, in order to prevent losses of volatile bases to inclose the re-acting materials in a gas-tight vessel and to stir the mixture mechanically and not by blowing air through it.

After the powdered organic basis has been subjected for a sufficiently long time to the chemical action of agents of one or other of the groups in question, or to the separate action of both in succession, it is separated mechanically from the liquid into which a part of the organic substance, capable of being attacked, has passed in a state of solution. The remaining basic or acid substance or substances are separated, if necessary, by chemical neutralization, and in any case by washing or levigating with water until the reaction is neutral. The bituminous material freed from water is then treated with a suitable solvent such as light tar oils, mono-chlorobenzene, dichlorobenzene, turpentine or the like. The solution thus prepared is filtered, whereby the insoluble organic decomposition products intentionally produced by the chemical action during the process remain on the filter as a residue and in this manner do not become part of the protective material.

The bituminous protective material rendered chemically stable in the aforesaid manner and dissolved in a suitable solvent can receive an addition of small quantities of material which agreeably to the particular application of the coating remain in the latter and lend it softness and elasticity. Such admixtures are for instance sulfur, linseed oil varnish, bodies of the paraffin family, and soaps insoluble in water.

Having thus described my invention and the best means I know of carrying the same into practical effect, I claim:—

1. A process for the manufacture of coating and impregnating materials, which comprises first subjecting pulverized bituminous material at a temperature below its melting point to the action of liquid having chemical action similar to that which will be exerted upon the coating or impregnating material when the latter is in use, then dissolving the bituminous material in a solvent, and separating the insoluble decomposition products therefrom.

2. A process for the manufacture of coating and impregnating materials, which comprises first subjecting pulverized bituminous material at a temperature below its melting point to the action of liquid having chemical action similar to that which will be exerted upon the coating or impregnating material when the latter is in use, then dissolving the bituminous material in a solvent, and filtering the solution.

In testimony, that I claim the foregoing as my invention, I have signed my name in presence of two witnesses, this seventeenth day of January, 1912.

CARL ROTH.

Witnesses:
JEAN GRUND,
CARL GRUND.